Figure 1:
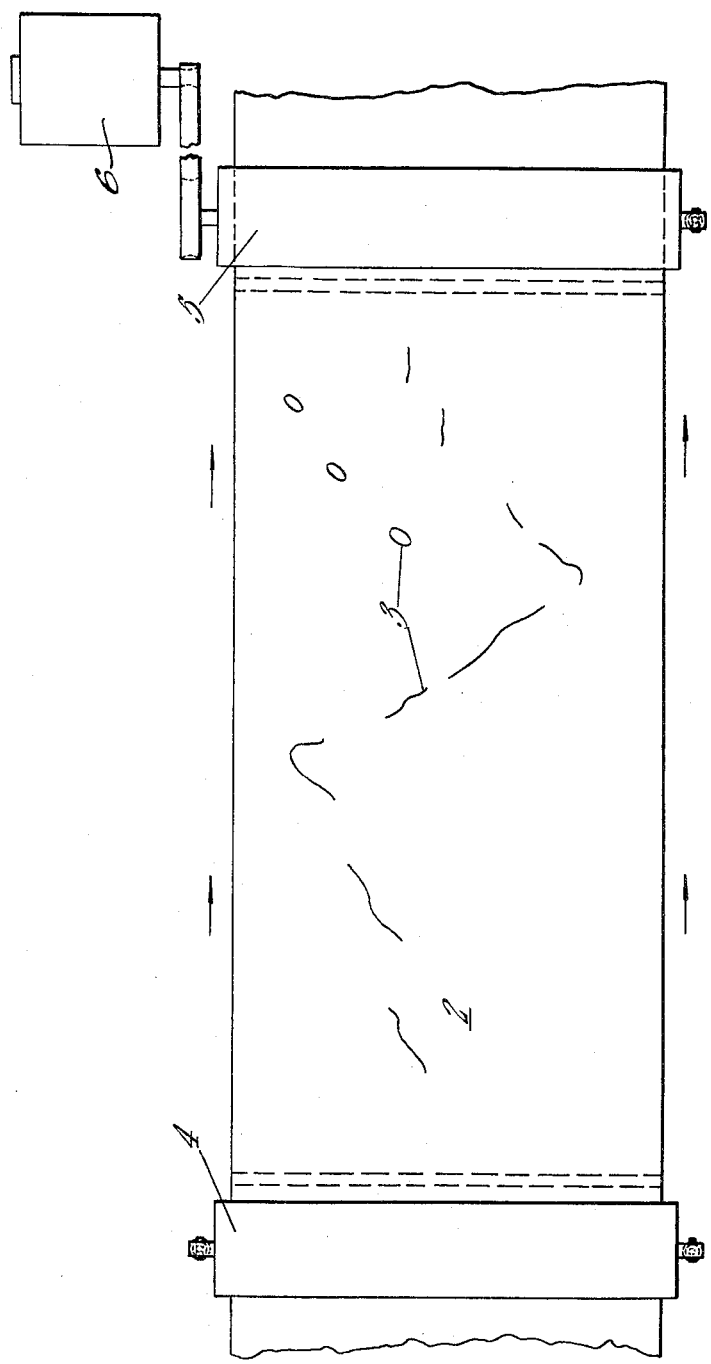

Jan. 16, 1962 K. PAYNE 3,016,792
METHOD OF PRODUCING A VISUAL MUSICAL RECORD
Filed April 23, 1956 3 Sheets-Sheet 1

Inventor
K. Payne
By Glascock Downing Seebold
Attys.

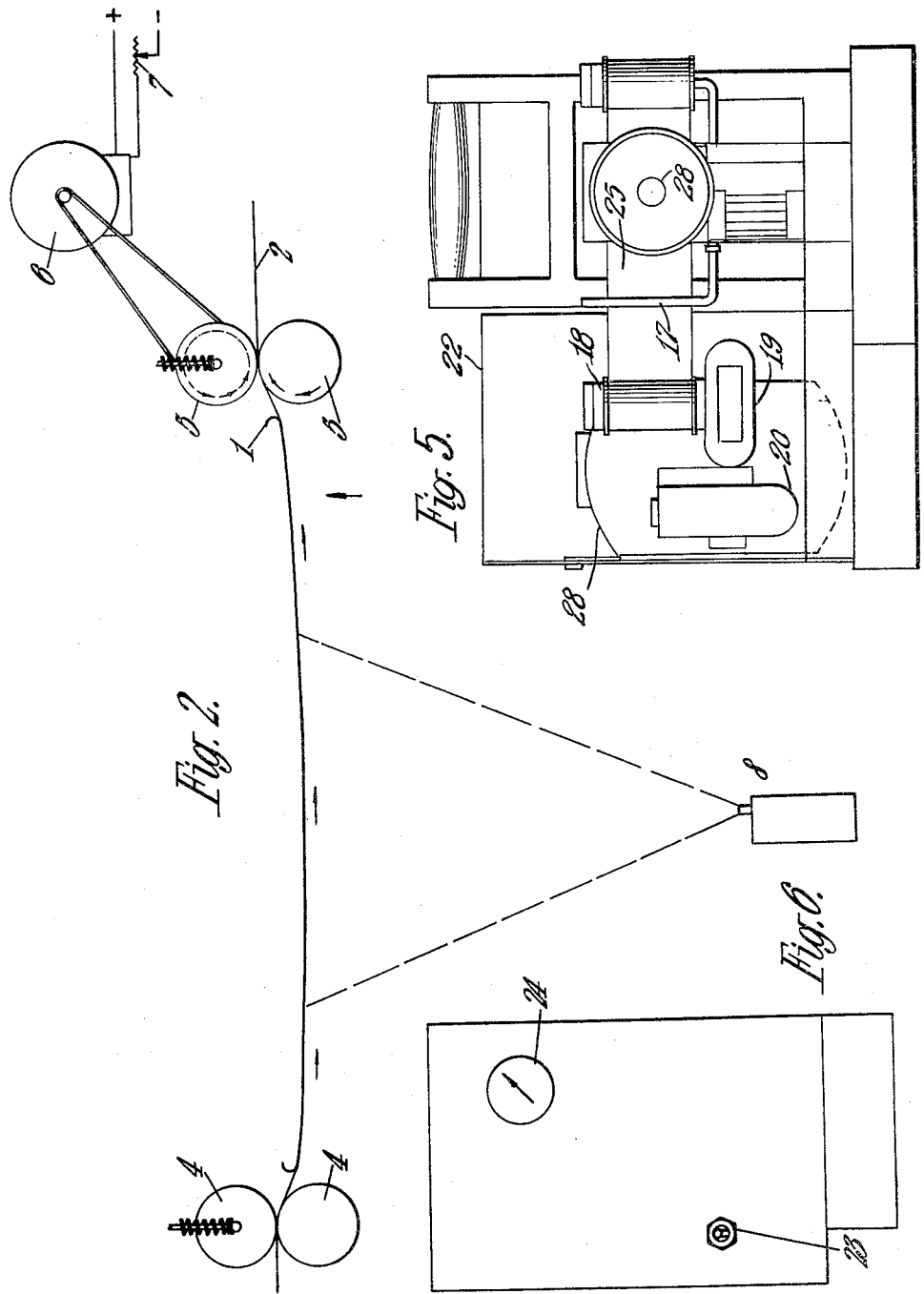

Jan. 16, 1962 K. PAYNE 3,016,792
METHOD OF PRODUCING A VISUAL MUSICAL RECORD
Filed April 23, 1956 3 Sheets-Sheet 3
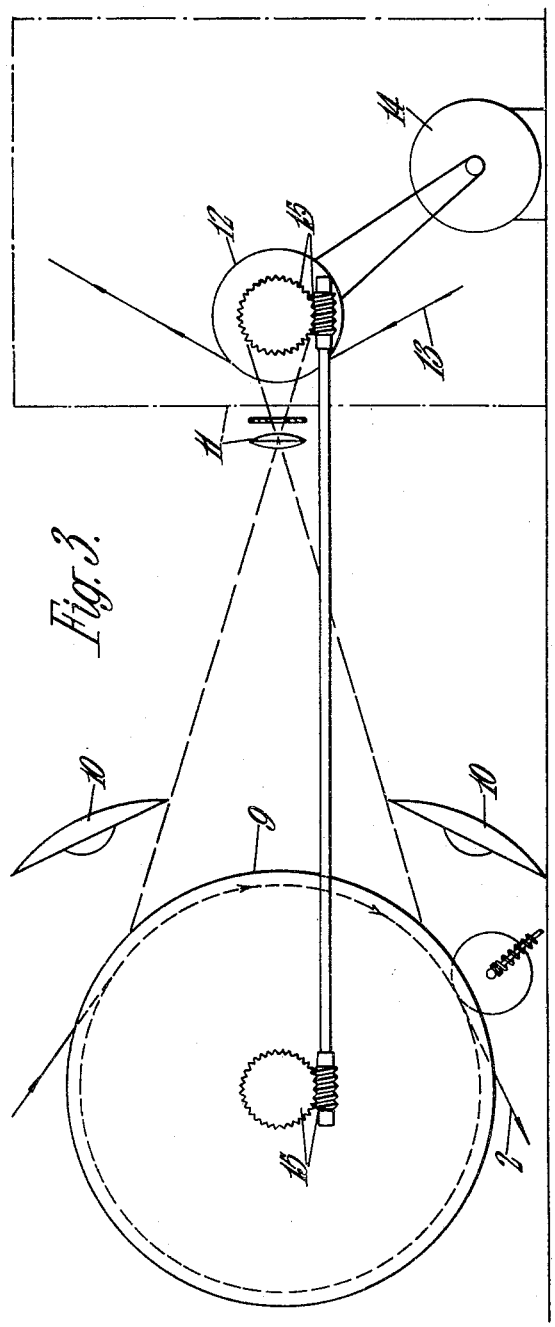
Inventor
K. Payne
By Clarence R. Downing Hubbell
Attys.

United States Patent Office 3,016,792
Patented Jan. 16, 1962

3,016,792
METHOD OF PRODUCING A VISUAL MUSICAL RECORD
Kenneth Payne, 22 Addiscombe Grove, Croydon, England
Filed Apr. 23, 1956, Ser. No. 580,048
1 Claim. (Cl. 88—24)

This invention relates to means for displaying or providing for the display of musical script moving continuously in synchronism with the music.

In accordance with the invention, the script is depicted as a continuous visual image along an elongated band at least several inches wide, and this is moved continuously whilst being photographed on a reduced scale to give a photographic reproduction on a continuous strip.

In one arrangement, the band is photographed by a cine camera operated at constant speed, but the band is moved at an operator-controlled speed by a variable speed motor whilst the corresponding music is being played, so that at any moment the respective part of the visual image is in the centre of the field. In this way, variations of tempo are accommodated so that, when the same music is reproduced whilst the cine film is being projected, there is no difficulty in keeping the two synchronised. In particular, the music may be recorded on the same cine film as the visual image, for simultaneous sound and image reproduction.

In another arrangement, the band is photographed as a continuous visual image by a camera in which a photographic film is moved at a speed less than but geared to that of the band. The resulting film-strip may then be projected by a projector incorporating an operator-controlled variable-speed motor, for continual adjustment as the music is being played to maintain synchronisation.

The invention also consists in a filmstrip projector comprising a variable speed continuous drive motor and an operator control for varying the speed of the motor whilst projection is being effected.

The music script which comes mainly into consideration is one in which the various instrumental and/or vocal parts are depicted within the same lateral limits, that is to say they are superposed, and differentiated from one another by colour and/or the use of specific symbols, such as a continuous line for a melody played by a violin and a dot or circle for a particular note played by a percussion instrument.

The invention is further described with reference to the accompanying diagrammatic drawings, of which:
FIGURE 1 is a plan view of a portion of a band bearing musical script being moved at a variable speed,
FIGURE 2 is an elevation corresponding to FIGURE 1 but also showing a cine camera in position,
FIGURE 3 is a side view of apparatus used for reproducing a band, such as is shown in FIGURE 1, as a filmstrip.
FIGURE 4 is a plan view corresponding to FIGURE 3,
FIGURE 5 is a front view of a variable speed filmstrip projector, and
FIGURE 6 is a rear view of the left-hand portion of FIGURE 5.

Referring to FIGURES 1 and 2, there is provided a backing plate 1 for a band 2 bearing musical script 3, the band being passed between a spring-loaded pair of idler rollers 4 and a spring-loaded pair of drive rollers 5 the latter being driven by a variable speed electric motor 6 associated with an operator's control 7. Mounted in front of band 2 is a cine camera 8 adapted to be driven at constant speed.

Referring to FIGURES 3 and 4, there is provided a drum 9 around part of the circumference of which band 2 is passed under the control of tensioning means (not shown). Lamps 10 illuminate the band 2 on the drum for reproduction by a camera 11 comprising a drum 12 smaller than drum 9, around part of the circumference of which a filmstrip 13 is passed, under the control of tensioning means (not shown). An electric motor 14 serves to drive drum 12 and also, by means of gears 15, drum 9 at a proportionately higher peripheral speed.

The band 2 may conveniently be 3–6 inches wide.

The filmstrip projector shown in FIGURE 5 is of generally known construction, incorporating a wind-off spool support 16 and a wind-on spool support 17, but the latter is not used and, in its place, there is provided a wind-on spool support 18 arranged to be driven, through two worm reduction gears 19 and 20, by a variable speed electric motor 21. This motor is mounted in front of a control box 22 housing an on-and-off switch 23 (FIGURE 6) and a rheostat (not shown) regulated by knob 24. Filmstrip 25 is shown in an operative position, passing behind the projector lens 26.

It is therefore clear that the method of this invention includes depicting a musical composition in script form at least on a wide band. The script is depicted as a continuous visual image along this band. The band is passed longitudinally of its axis in front of and past the optical axis of a constant speed cine camera, the band moves transversely of the optical axis of the camera, and the musical composition is played while the band is moving past the camera so that the script on the band is photographed on the film on the camera. The speed of movement of the band is controlled in accordance with the variations in tempo of the musical composition being played so that at any moment the portion of the script on the band that is in front of the camera is in correspondence with that same portion of the musical composition as it is being played. Thereby the film in the camera provides a continuous visual record of a musical script that coincides with the tempo of the musical composition that has been played.

It will be understood that the original depiction of the script along the continuous band will be done manually.

I claim:

The method of producing a displayable visual record of a musical script comprising depicting a musical composition in script form on a band of at least several inches in width with the script being depicted as a continuous visual image along such band, passing the band longitudinally of its axis in front of and past the optical axis of a constant speed cine camera having film therein, with the band moving transversely of such optical axis while playing the musical composition so that the script on the band is photographed on the film in the camera, and controlling the speed of movement of the band in accordance with the variations in tempo of the musical composition being played so that at any moment the portion of the script on the band that is in front of the camera is in correspondence with that same portion of the musical composition as it is being played whereby the film in the camera provides a continuous visual record of a musical script that coincides with the tempo of the musical composition that has been played.

References Cited in the file of this patent

UNITED STATES PATENTS

| | | |
|---|---|---|
| 973,391 | Severy | Oct. 18, 1910 |
| 1,428,995 | Springfield et al. | Sept. 12, 1922 |
| 1,573,696 | Fleischer | Feb. 16, 1926 |
| 1,631,450 | Andrews | June 7, 1927 |
| 1,778,104 | Conkie | Oct. 14, 1930 |
| 1,913,048 | Disney | June 6, 1933 |
| 2,000,286 | Howell | May 7, 1935 |
| 2,103,766 | Cahill | Dec. 28, 1937 |
| 2,390,389 | Redler | Dec. 4, 1945 |
| 2,403,711 | Egan | July 9, 1946 |
| 2,521,951 | Schubert | Sept. 12, 1950 |
| 2,600,968 | Church | June 17, 1952 |